H. P. KRAFT.
INFLATING COUPLING.
APPLICATION FILED MAR. 15, 1917.

1,364,440.

Patented Jan. 4, 1921.

WITNESSES:
René Bruine
J. F. Wallace

INVENTOR
Henry P. Kraft
By Attorneys,

UNITED STATES PATENT OFFICE.

HENRY P. KRAFT, OF RIDGEWOOD, NEW JERSEY.

INFLATING-COUPLING.

1,364,440.  Specification of Letters Patent.  Patented Jan. 4, 1921.

Application filed March 15, 1917. Serial No. 154,954.

*To all whom it may concern:*

Be it known that I, HENRY P. KRAFT, a citizen of the United States of America, residing in Ridgewood, in the county of Bergen and State of New Jersey, have invented certain new and useful Improvements in Inflating-Couplings, of which the following is a specification.

This invention relates to inflating couplings for pneumatic tires and aims to provide certain improvements therein.

This type of coupling is commonly employed in connection with tanks of compressed air such as are usually used in garages, the coupling being attached to the end of the pipe line and being adapted to make an automatic connection with a tire valve. The best forms of such couplings include an internal valve which is normally closed by the pressure within the pipe line and which is adapted to be opened during the application of the coupling to the valve casing. The opening means, which are automatic, usually contact with the nipple of the valve, being forced upward by engaging the check valve and holding it in its open position until the coupling is removed from the tire valve. One instance of such type is set forth in my application No. 59603.

The present invention seeks to improve the construction set forth in such application and to render it more durable and effective.

In the drawings wherein I have shown one form of the device,—

Figure 1:
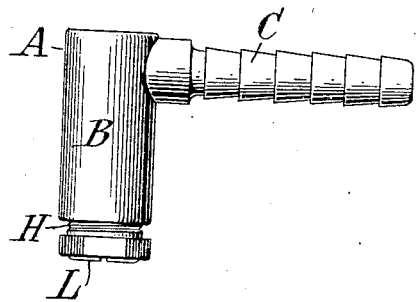
Figure 1 is a side elevation.
Figure 2:
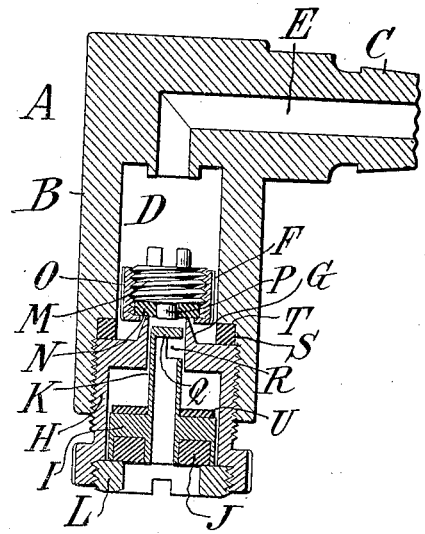
Fig. 2 is an enlarged diametrical section of Fig. 1.
Figure 3:
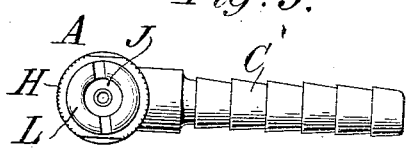
Fig. 3 is a bottom plan view of Fig. 1.
Figure 4:
Fig. 4 is an elevation of the check valve.
Figure 5:
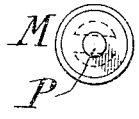
Fig. 5 is a top view thereof.
Figure 6:
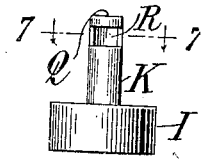
Fig. 6 is an elevation of the opening device.
Figure 7:
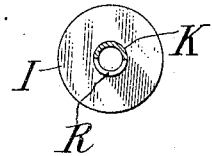
Fig. 7 is a section thereof on the line 7—7 in Fig. 6.

Referring to the drawings, let A indicate the coupling shell or casing as a whole which best comprises a barrel or cylindrical body portion B and an angular extension or nipple C which is adapted to be connected with the pipe line. Within the cylinder B is a chamber D connected to the bore E of the extension C. Within the chamber D is mounted a check valve F designed to coact with a seat G carried upon a seat member H. Within the seat member is mounted a valve opener I provided at its lower end with a packing or gasket J adapted to contact with the nipple of a valve casing, and having an opening element K adapted to pass up through the seat G and engage the underside of the valve F. The seat member H screws into the cylinder B, and the valve opener I is maintained within the seat member by a retainer L best formed as a ring which engages an internal thread at the lower end of the seat member.

These parts are in general substantially those shown in my aforesaid application.

The present invention includes an improvement in the check valve F. This valve comprises a body portion M which is screw-threaded on its exterior, and a packing or gasket N held in place on the underside of the body portion by a screwthreaded collar O. The packing N is found to be subject to considerable wear in use, particularly at the point where it is engaged by the valve opening element K. According to the present invention I provide an abutment P which is arranged centrally of the check valve and which is preferably formed as an integral part of the body M, this abutment being extended to a point below the lower face of the packing N and being adapted to engage the valve opening element. As thus constructed the packing gasket assumes the shape of a ring, through the central opening of which the abutment P extends. This construction therefore supports and protects the packing as well as constituting the means of relieving the latter of any wear due to the pressure of the valve opener on its underside. According to the present invention I also form the valve opening element K with a closed top, as indicated at Q, or at least with a top which is sufficiently closed to make sure of the definite engagement with the abutment P. In this case the bore of the valve opener is provided with a lateral opening R, as shown, or an equivalent means for introducing the air into the interior of the opener, whence it flows to the tire valve.

In my former application I provided a packing between the seat member H and the cylinder B which packing was arranged the cylinder B which packing was arranged between the end of the cylinder and a flange formed on the seat member. I have found in practice, however, that this packing which is not supported externally, is apt to work loose from between the parts. According to the present invention I locate the packing S between the inner end of the seat member, and an interior shoulder T formed in the cylinder B.

In order that a tight joint may be formed between the valve opener and the inner side of the seat member, a packing ring such as U may be arranged within the seat member and preferably carried by the valve opener as shown.

While I have shown and described one form of the invention, it will be understood that I do not wish to be limited thereto, since various changes may be made therein without departing from the spirit of the invention.

What I claim is:—

1. An inflating coupling, comprising a casing, a check valve and a valve opener, said casing having a valve chamber and a valve seat, said check valve having an annular gasket and a central abutment projecting through the gasket, and the valve opener movable independently of the check valve and adapted to be displaced by engagement with the tire valve to engage said abutment and unseat said check valve.

2. An inflating coupling, comprising a casing, a check valve, and a valve opener, said casing having a valve chamber, said check valve having an annular gasket and a central abutment projecting through the gasket, said valve opener movable independently of the check valve, and comprising a tubular stem closed at its end to form an abutment for engaging the abutment of the check valve.

In witness whereof, I have hereunto signed my name.

HENRY P. KRAFT.